United States Patent [19]
Lee

[11] Patent Number: 5,295,003
[45] Date of Patent: Mar. 15, 1994

[54] COLOR CONVERSION SYSTEM FOR MONOCHROMATIC OPTICAL SCANNER

[76] Inventor: Aldric K. Lee, 4163 Cochran Chapel, Dallas, Tex. 75209

[21] Appl. No.: 668,669

[22] Filed: Mar. 13, 1991

[51] Int. Cl.⁵ .............................................. H04N 1/46
[52] U.S. Cl. .................................. 358/509; 358/512; 358/473
[58] Field of Search ............... 358/471, 473, 474, 494, 358/484, 75, 509, 512; 362/252, 260, 293; 382/59; H04N 1/04, 1/46

[56] References Cited

U.S. PATENT DOCUMENTS

| | | | |
|---|---|---|---|
| 3,682,539 | 8/1972 | Yamaji et al. | 362/231 |
| 4,583,116 | 4/1986 | Hennig et al. | 358/75 |
| 4,611,246 | 9/1986 | Nihei | 358/473 |
| 4,642,679 | 2/1987 | Nagano | 358/75 |
| 4,647,963 | 3/1987 | Johnson et al. | 358/80 |
| 4,692,795 | 9/1987 | Nakao | 358/471 |
| 4,721,969 | 1/1988 | Asano | 346/157 |
| 4,797,544 | 1/1989 | Montgomery et al. | 250/221 |
| 4,809,062 | 2/1989 | Chen | 358/75 |
| 4,833,533 | 5/1989 | Augusti et al. | 358/80 |
| 4,855,818 | 8/1989 | Morimoto | 358/75 |
| 4,866,478 | 9/1989 | Kasahara et al. | 362/11 |
| 4,868,663 | 9/1989 | Grimaldi et al. | 358/471 |
| 4,908,717 | 3/1990 | Natori | 358/474 |
| 4,931,862 | 6/1990 | Nakao et al. | 358/75 |
| 4,947,261 | 8/1990 | Ishikawa et al. | 358/473 |
| 4,996,775 | 3/1991 | Sass et al. | 358/473 |

OTHER PUBLICATIONS

IBM Technical Disclosure Bulletin, Digital Color Halftone Reproduction, Jun. 1985, vol. 28, No. 1.

*Primary Examiner*—Edward L. Coles, Sr.
*Assistant Examiner*—Kim Yen Vu
*Attorney, Agent, or Firm*—David L. McCombs

[57] ABSTRACT

A color conversion system for optically scanning a target document or the like utilizing a monochromatic scanner connected to a computer is disclosed. The target is illuminated with a light source. The light is filtered from the light source to direct either red, green or blue frequency light to the scanner. The target is scanned three times, the scanner receiving red frequency light in a first scan, green frequency light in a second scan and blue frequency light in a third scan. The foregoing scans may occur in any order. In each of the scans, the light reflected from the target to the scanner is processed to generate corresponding red image data, green image data and blue image data. The red, green and blue image data is combined to generate multiple color image data. The multiple color image data may be displayed or printed to produce a multiple color image representative of the image on the target.

9 Claims, 2 Drawing Sheets

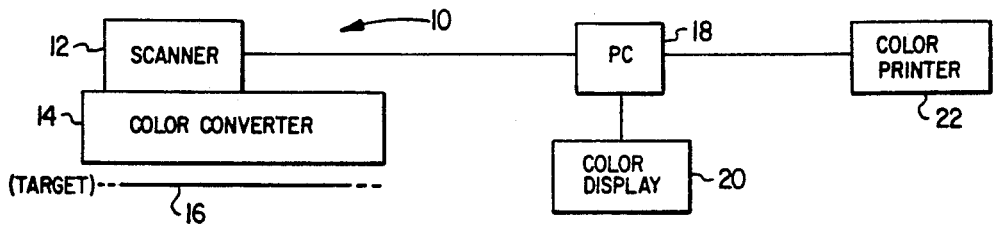
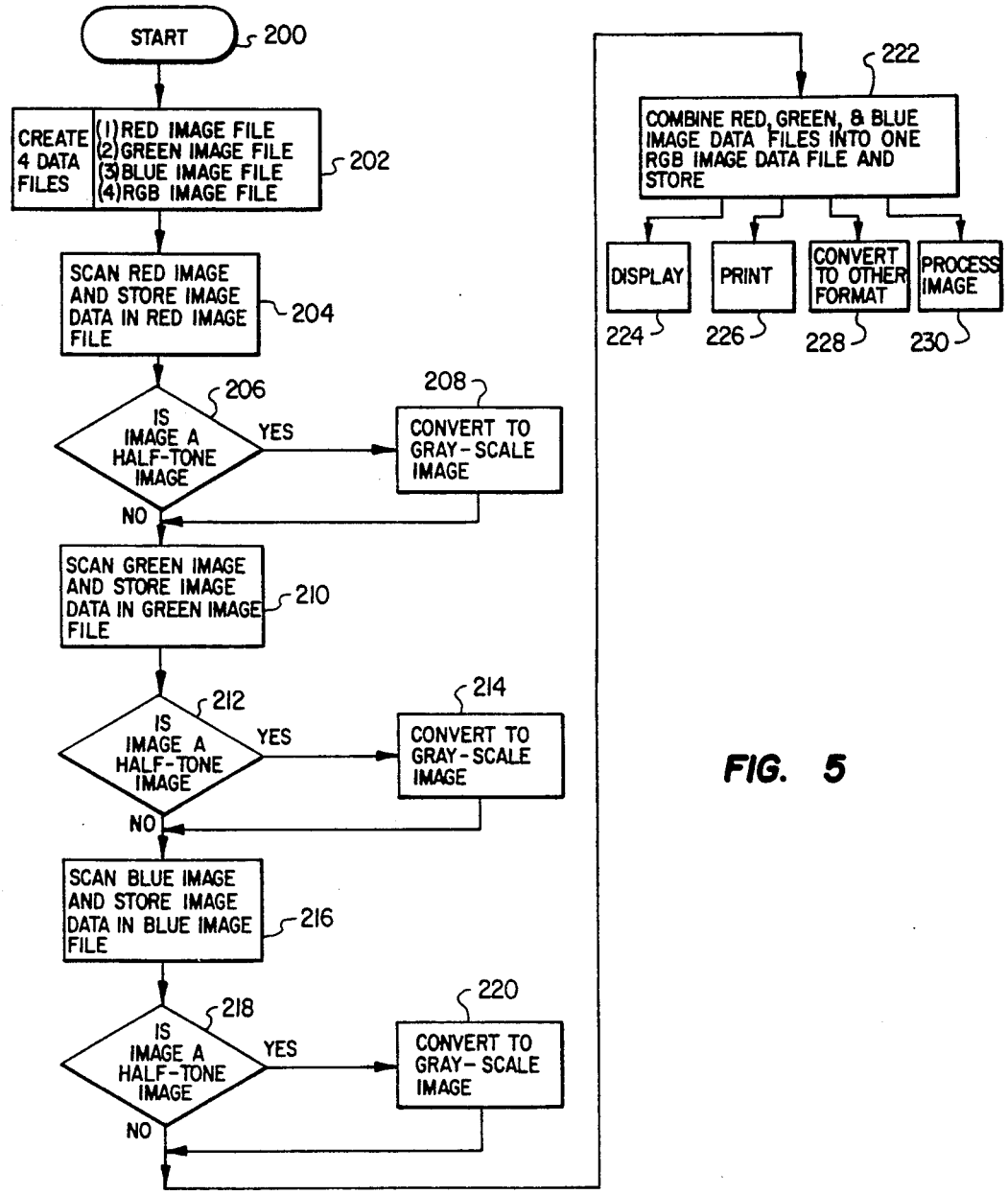

COLOR CONVERSION SYSTEM FOR MONOCHROMATIC OPTICAL SCANNER

FIELD OF INVENTION

The present invention relates generally to optical scanners; and particularly, to a method and apparatus for performing color scanning using a monochromatic scanner.

BACKGROUND OF THE INVENTION

An optical scanner is a well-known device used to read an original image contained on a graphic or textual document, photograph or the like, and convert the image to electrical signals that a computer can interpret. The scanner provides an interface between the computer and the image which enables the computer to store, modify and reproduce the image. The scanning of text and graphics greatly reduces the time, labor and cost associated with image generation, manipulation and printing.

Relatively inexpensive, hand-held scanners are available which may be connected by a flexible cord to the input port of a laptop or personal computer (PC). The sensing mechanism of the scanner includes a light source and a system for measuring the light reflected from the image to be scanned by means of a photosensitive silicon chip called a charged-coupled device (CCD). Some scanners may use photodiodes instead of CCD's, without altering the principles involved. As the sensing mechanism scans the image, it generates an array of electrical signals which are converted to digital form and handled by the computer's processor. The resulting digital array corresponding to the image of the target surface is known as a bit map or raster image. The computer's software stores the digital data and manipulates it to generate the desired graphic or textual images which may then be displayed, printed or otherwise used.

Such inexpensive scanners typically incorporate light emitting diodes (LED's) as the light source to light the target area of the image to be scanned. Because LED's emit only a single frequency of light (such as red or green), the scanned image will always be monochromatic. The monochromatic image may be generated in scan patterns of black and white (referred to as a line scan), shades of gray (referred to as a gray scale scan) or halftone (referred to as a "dithered" scan, in which black and white dots are grouped together to produce a halftone reproduction simulating shades of gray).

A monochromatic scanner of the type described is not equipped to generate digital data representative of the true colors contained in the target image. This shortcoming is especially undesirable for graphics applications where a multiple color document, photograph or other image is to be scanned. While color scanners are available, they are much more expensive than monochromatic scanners.

SUMMARY OF THE INVENTION

The invention recognizes a need for a system which easily adapts a monochromatic scanner to accomplish color scanning.

According to the invention, a method and apparatus is provided for optically scanning a target, such as a document or other surface, to produce a multiple color, scanned image of the target utilizing a monochromatic scanner connected to a computer. The target is illuminated with a light source. The light is filtered from the light source to direct either red, green or blue frequency light to the scanner. The target is scanned three times, the scanner receiving red frequency light in a first scan, green frequency light in a second scan and blue frequency light in a third scan. The foregoing scans may occur in any order. In each of the scans, the light reflected from the target to the scanner is processed to generate corresponding red image data, green image data and blue image data. The red, green and blue image data is combined to generate multiple color image data. The multiple color image data may be displayed or printed to produce a multiple color image representative of the image on the target.

The system of the invention reduces the cost associated with color scanning by allowing existing monochromatic scanning equipment to be adapted to this purpose.

BRIEF DESCRIPTION OF THE DRAWINGS

The novel features believed characteristic of the present invention are set forth in the appended claims. The invention itself, however, as well as other features and advantages thereof, will best be understood by reference to the following detailed description of an illustrative embodiment when read in conjunction with the accompanying figures, wherein:

FIG. 1 is a block diagram of a color conversion system for scanners used in the preferred embodiment;

FIG. 5 is a flow chart of the methods of the color conversion system used in the preferred embodiment.

DETAILED DESCRIPTION

Figure 2:
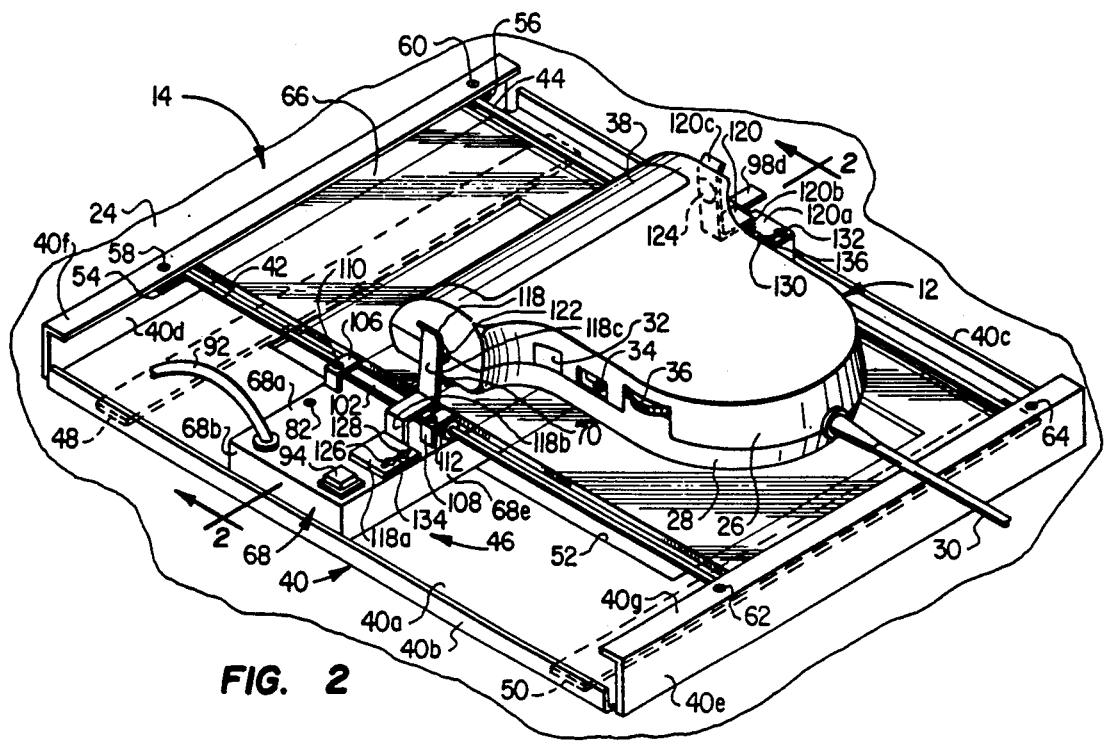
FIG. 2 is a perspective view of a color converter and scanner of the system of FIG. 1 used in the preferred embodiment.

Referring to FIG. 1 of the drawings, the reference numeral 10 refers to a system of the present invention for providing a monochromatic scanner 12 with color scanning capability. A color converter 14, as will be described in detail below, is placed between a target 16 to be scanned and the scanner 12, for enabling the scanner to read three separate color images from the target without requiring disassembly or modification of the scanner. The target 16 may be a graphic picture, document or other surface bearing an image to be scanned. A computer 18 such as a desk top or personal computer (PC) is electronically connected to the scanner 12 for processing the electrical signal information received from the scanner. Software instructions, as will be subsequently described, enable the computer 18 to store image data for the three separate color images, scanned from the target 16 using the converter 14. The image data of the separate color images are then combined to synthesize and store data representative of a single, multiple color image. A color display 20 and a color printer 22 are connected to the processor 18 for viewing or printing, respectively, the multiple color image.

In the preferred embodiment, the scanner 12 is a monochromatic, hand-held scanner referred to as a "Handy Scanner 3000-plus" available from DFI Corporation. The scanner 12 uses light emitting diodes (LED's), not shown, to light the scanning area of the target 16. Because the LED's emit only a single frequency of light, the scanner 12 produces monochromatic image data. The computer 18 is preferably an IBM PC/AT or other IBM compatible computer having sufficient memory and graphics capabilities to perform color scan processing. The color display 20 is preferably a VGA monitor and the color printer 22 a laser printer.

Referring to FIG. 2, the color converter 14 is shown resting on a surface 24. The converter 14 overlies the target 16. The scanner 12 is mounted to the converter, as described further below, so that the scanner is located directly over the target 16 and is elevated slightly above the target.

Mating upper and lower plastic shells 26 and 28 are intersecured to a define a housing containing the components of the scanner 12. Tracking rollers (not shown) protrude from the underside of the lower shell 28. The tracking rollers register movement of the scanner 12 during use. A flexible cord 30 extends from the rear portion of the scanner 12 for interconnecting the scanner to the input port (not shown) of the computer 18. An on/off switch 32, a scan select switch 34 and a contrast dial 36 are positioned along the side of the upper shell 26 of the scanner 12 for controlling various functions of the scanner. The on/off switch 32 is used to turn on or off the power to the scanner 12. The scan select switch 34 is movable between four positions to select either black and white (line scan), gray scale or one of two halftone scan modes. The contrast dial 36 is rotatable to select the contrast or brightness of the scanned image. While not shown, a dots-per-inch (DPI) selection switch may be provided for selecting the number of dots per inch of the scanned image. A transparent window 38 covers the front portion of the scanner 12 for interface on its lower surface with the image to be scanned from the target 16. While not shown, light emitting diodes (LED's) are provided behind the window 38 as a monochromatic (in this instance red) light source. Also not shown are a system of mirrors and lenses provided behind the window 38 for focusing the light reflected from the target 16 onto charge-coupled diode (CCD) light sensors. Since this arrangement is conventional, it is not shown and will not be described further.

The converter 14 includes a rigid frame 40 and guide rails 42 and 44 extending from the opposing ends of the frame. A filter carriage 46 is supported for translational movement between the ends of the frame 40 by the guide rails 42, 44.

A rectangular, flat base 40a of the frame 40 supports the various components of the converter 14 relative to the surface 24. First and second support pads 48 and 50 are adhered to the bottom of the base 40a to further support the base and prevent it from inadvertently slipping relative to the surface 24 during operation of the system 10. The pads 48, 50 are made of elastomeric material. A rectangular, image viewing window 52 is defined by the base 40a of the frame 40. The window 52 is approximately the width of the front end of the scanner 12 and extends the substantial length of the base 40a. The target 16 is placed on the surface 24 and beneath the window 52, so that the portion of the image to be scanned appears in the window. Side panels 40b and 40c of the frame 40 each extend along an opposing side of the frame projecting upwardly from the base 40a at right angles. The side panels 40b, 40c provide structural support for the frame 40 and further assist in guiding the filter carriage 46 as it moves between the ends of the frame. First and second end walls 40d and 40e of the frame 40 extend upwardly at right angles from the respective ends of the base 40a. First and second flanges 40f and 40g, extend, respectively, at right angles along the top of the end walls 40d, 40e and inwardly over the base 40a. The end walls 40d, 40e and their respective flanges 40f, 40g support the guide rails 42, 44 as described below.

Brackets 54 and 56, each having a vertically-disposed first leg and a horizontally-disposed second leg, are secured to the underside of the flange 40f to hold the ends of the respective guide rails 42, 44 in place. Fasteners 58, 60 extend through the flange 40f and the horizontally-disposed second leg of each of the brackets 54, 56 so as to hold the ends of the rails 42, 44 between the respective second legs and the underside of the flange. Similarly, brackets (not shown) each having a vertically-disposed first leg and a horizontally-disposed second leg are secured to the underside of the flange 40g extending from the end wall 40c, to hold the other ends of the respective guide rails 42, 44 in place. Fasteners 62, 64 extend through the flange 40g and the horizontally-disposed second leg of each of the brackets (not shown) to hold the ends of the rails 42, 44 between the respective second legs and the underside of the flange. Parallel alignment of the guide rails 42, 44 may be adjusted by loosening the fasteners 58, 60 or 62, 64. The ends of the rails 42, 44 may then be moved laterally and the fasteners 58, 60 and 62, 64 retightened.

A rectangular panel of glass 66 occupies the portion of the frame 40 between the guide rails 42, 44 and is supported at each end against the underside of the respective flanges 40f, 40g of the first and second end walls 40d, 40e. The glass 66 is held in place on the underside of the flanges 40f, 40g by brackets (not shown). The glass 66 supports the underside of the scanner 12 as it is moved in conjunction with the filter carriage 46 from one end of the frame 40 to the other, as described further below. The glass 66 provides a frictional surface for engagement of the tracking wheels (not shown) of the scanner 12. The glass 66 is substantially transparent to permit light to pass through it from the filter carriage 46 to the window 38 of the scanner 12.

Figure 3:
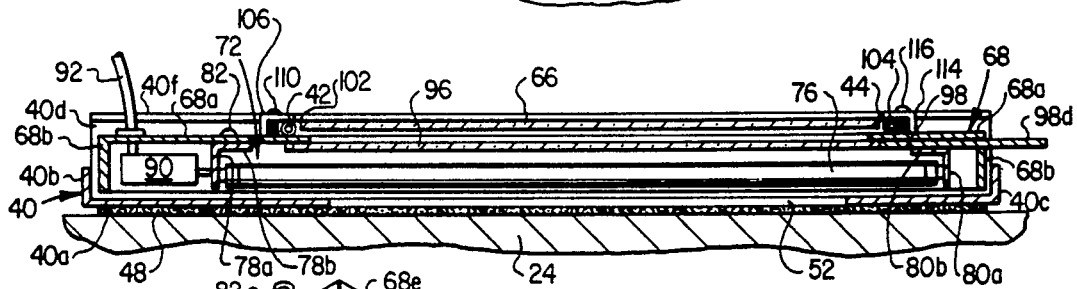
FIG. 3 is an enlarged, cross-sectional view of the color converter taken along line 2—2 of the FIG. 2.
Figure 4:
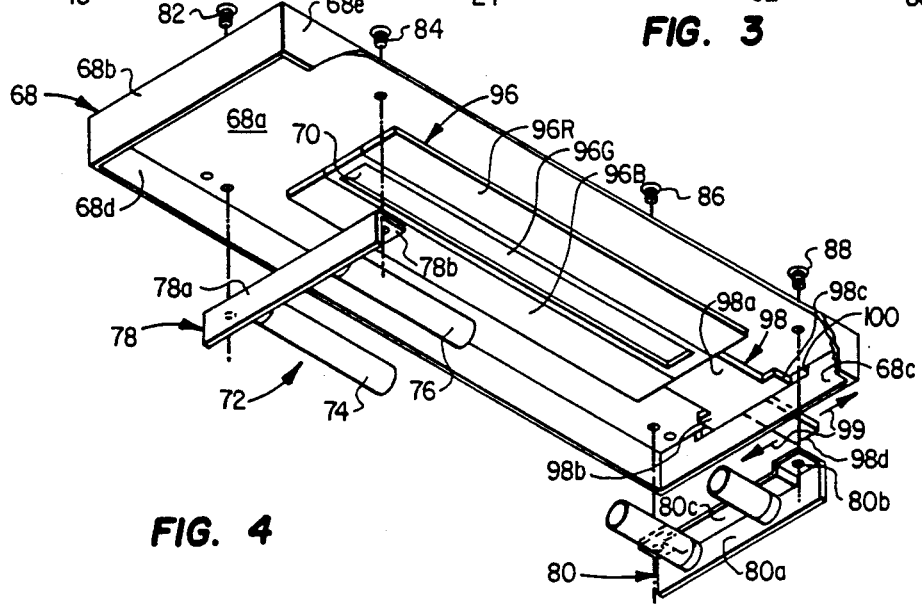
FIG. 4 is an enlarged, partially broken away and exploded view of a filter carriage of the converter of FIG. 2 used in the preferred embodiment.

Referring also to FIGS. 3 and 4, a housing 68 encases the various components of the filter carriage 46. The housing 68 includes a top panel 68a, side panels 68b and 68c extending downwardly (as shown in the drawings) from the respective sides of the top panel, and first and second end panels 68d, 68e also extending downwardly from the respective ends of the top panel. A filter window 70 is defined in the top panel 68a of the housing 68 for reasons described below.

A full spectrum (white) light source 72 is contained in the filter carriage 46 in order to illuminate the target 16. A pair of fluorescent tubes 74, 76 are connected at each of their ends by brackets 78 and 80 to the underside of the top panel 68a of the housing 68. The brackets 78, 80 each have a vertically-disposed first leg 78a, 80a and a horizontally-disposed, second leg 78b, 80b. The second leg 80b of the bracket 80 is stepped to define a recessed portion 80c, for reasons to be described. The tubes 74, 76 are oriented parallel to the filter window 70 and are disposed on either side of the filter window. The ends of the fluorescent tubes 74, 76 are secured by electrical sockets (not shown) to the first legs 78a, 80a of the brackets 78, 80. Fasteners 82 and 84 secure the second leg 78b of the bracket 78 to the top panel 68a. Fasteners 86 and 88 secure the second leg 80b of the bracket 80 to the top panel 68a.

Transformer circuitry, represented by block 90 in FIG. 3, is electrically connected by suitable wiring (not shown) to the fluorescent tubes 74, 76. The transformer circuit block 90 provides for high frequency, high voltage electricity to tubes 74, 76. Conventional transformers produce a periodic oscillation of sixty (60) Hertz (Hz). This is considered inadequate for a light source used in a scanning application. Scanning occurs so quickly that the resulting scanned image will show alternate bands of light and dark portions of the image, referred to as "flicker". The transformer circuit block 90 provides for a periodic oscillation within the range of two to twenty (2-20) kilohertz (khz) to provide a clear and consistent scanned image which avoids flicker. Since the details of the transformer circuit block 90 are conventional, it is not shown in greater detail.

A power cord 92 extends through an opening in the top panel 68a of the housing 68 for providing electricity to the transformer circuit block 90. While not shown, the power cord 92 may be connected to a 12-volt adapter and plugged into a conventional AC power outlet. An on/off switch 94 is secured to the top panel 68a of the housing 68 and is connected to the circuit block 90 for turning on and off the fluorescent tubes 74, 76.

A filter element 96 is positioned between the fluorescent tubes 74, 76 and the underside of the top panel 68a. As will be described subsequently in detail, the filter element 96 allows for the separation of red, green and blue light spectrum for creating multiple color scanned images. The filter element 96 includes a red filter portion 96R, a green filter portion 96G and blue filter portion 96B. The filter portions 96R, 96G, 96B are parallel to each other and extend the length of the filter element 96. Each of the filter portions 96R, 96G, 96B are sufficient width so that when in the selected position only the selected portion will cover the filter window 70. The filter portions 96R, 96g, 96b are commercially-available color gel filters and are laminated between two sheets of clear plastic (not shown).

A rigid filter support plate 98 having a first end 98a, lateral end stops 98b, 98c and a filter selection switch 98d is used to support and manipulate the filter element 96. The first end 98a of the plate 98 is connected by adhesive, tape or other fastening means (not shown), to an end of the filter element 96. The opposing end of the filter element 96 rests across the top of the tubes 74, 76. A slot 100 is defined in the side panel 68c of the housing 68 for receiving the support plate 98 and supporting it relative to the housing. A portion of the first end 96a and the end stops 96b, 96c occupy the space between the recessed portion 80c of the bracket 80 and the underside of the housing top panel 68a. The filter selection switch 98d extends outwardly from the housing side panel 68c through the slot 100. The filter selection switch 98d is manually operable to move the support plate 98 and the filter element 96 relative to the housing 68 in the directions shown by the arrows 99. By manipulating the filter selection switch 98d the desired red, green or blue filter portion 96R, 96G, 96B of the filter element 96 may be selected for placement under the filter window 70. The lateral end stops 98b, 98c of the support plate 98 engage the portions of the side panel 68c defining the ends of the slot 100 when the filter selection switch 98d is moved too far and either direction. The end stops 98b, 98c of the support plate also keep the filter element 96 properly aligned and prevent it from twisting out of its proper operating position.

Sleeve members 102 and 104 circumscribe the rails 42 and 44, respectively, and are utilized to movably support the carriage 46 relative to the rails and the frame 40. Brackets 106 and 108 connect the sleeve member 102 to the upper surface of the top panel 68a of the carriage 68. The brackets 106, 108 have vertical legs 106a, 108a and horizontal legs 104b, 106b. Fasteners 110, 112 extend, respectively, through the horizontal legs 104b, 106b of the brackets 104, 106 and the top panel 68a, holding the sleeve member 102 in place. The sleeve member 104 is similarly affixed to the top panel 68a by two brackets, one of which is shown in FIG. 3 and designated by the reference numeral 114. The bracket 114 includes a vertical leg 114a and a horizontal leg 114b. A fastener 116 extends through the horizontal leg 114b and into the top panel 68a to hold the sleeve member 104 in place.

Two opposing clips 118 and 120 are provided for removably securing the scanner 12 to the carriage 46. The clips 118, 120, each include a base portion 118a, 120a, and a leg portion 118b, 120b. Each of the leg portions 118b, 120b is stepped inwardly toward the scanner 12 so as to clear the respective sleeve members 102, 104, and define upper, grip portions 118c, 120c. The grip portions 118c, 120c are vertically oriented as shown in FIG. 2. The upper ends of the grip portions 118c, 120c are curled outwardly away from the scanner 12 so that they may easily be biased for placement and removal of the scanner between the clips 118, 120. Rubber pads 122, 124 are adhered to the inner sides of the respective grip portions 118c, 120c for engagement of the sides of the front end of the scanner 12.

Fasteners 126, 128 secure the base portion 118a of the clip 118 to the top panel 68a of the filter carriage 68. Fasteners 130, 132 similarly secure the base portion 120a of the clip 120 to the top panel 68. Slots 134 and 136 are defined in the respective base portions 118, 120 for receiving the fasteners and allowing for the lateral movement of the clips 118, 120 to adjust the tension on the clips according to the width of the particular scanner 12.

In operation of the system 10, the target 16 to be scanned is placed on the surface 24 beneath the color converter 14 so that the portion to be scanned appears in the image viewing window 52. The scanner 12 is placed on top of the glass 66 of the converter 14 and secured to the filter carriage 46 between the clips 118, 120. The lower surface of the window 38 of the scanner 12 is oriented with respect to the carriage 46 so that light reflected from the target 16 by the light source 72 passes through the filter window 70 to the LED light sensors (not shown) located within the window 38 of the scanner.

The light source 72 illuminates the target 16 with a full spectrum of light. The light reflected from the target 16 may then be separated, as described below, using the filter element 96 into red, green, and blue light spectra.

The carriage 46 and the scanner 12 are oriented at the upper end of the frame 40 adjacent to the first end wall 40d. The filter selection switch 98d of the support plate 96 is positioned so that one of the filter portions 96R, 96G, 96B is selected and covers the filter window 74. The target 16 is then scanned by dragging the scanner 12 over the glass 66 from the upper end of the frame to the lower end of the frame adjacent to the end wall 40e. Since the scanner 12 is connected to the carriage 46 by the clips 118, 120 the carriage moves with the scanner along the guide rails 42, 44. Image data is received by the computer 18 corresponding to the color of the particular filter portion 96R, 96G, 96B that is selected. The scanning process if repeated for each of the other two selections of the filter element 96. It is understood that the three separate color scans may be performed in any order.

The operation of the system 10 will now be further described in conjunction with a flow chart of FIG. 5. FIG. 5 describes functions to be executed by computer program instructions in the computer 18. The actual program code to perform these functions may be generated using conventional programming techniques, and is therefore omitted herein for clarity.

As shown in FIG. 5, the operation of the computer 18 begins with a START instruction at step 200. At step 202, four separate data files are created for storing information transmitted to the computer 18 from the scanner 12. A RED IMAGE FILE is created for storing image data of the red light frequency. Red image data is capable of being generated by the system 10 when the red filter portion 96R is selected. A GREEN IMAGE FILE is created for storing image data of the green light frequency range. Green image data can be generated by the system 10 when the green filter portion 96G is selected. A BLUE IMAGE FILE is created for storing image data in the blue light frequency range. Blue image data can be generated by the system 10 when the blue filter portion 96b is selected. An RGB IMAGE FILE is created to store combined red, green, and blue image data from the above three files. The combined data may be used to represent a single, multiple color image.

At step 204, a red image is scanned from the target 16. The associated red image data is stored in the RED IMAGE FILE. In order to accomplish the scanning of the red image, the red filter portion 96R is selected. Light reflecting off the target 16 from the light source 72 is filtered by the portion 96R so that the light passing through the window 70 to the scanner 12 is in the red frequency range. The scanner 12 is manually dragged across the surface of the glass 66 from the top end of the converter 14, adjacent to the first end wall 40d, to the bottom end of the converter, adjacent to the second end wall 40e. As the scanner 12 is moved, the carriage 46 moves simultaneously along the guide rails 42, 44 so that the underside of the window 38 of the scanner is maintained over the filter window 70.

At step 206, the computer 18 determines whether the scanner 12 is scanning a halftone image. As previously mentioned, a halftone scanned image is also referred to as a "dithered" scan, meaning that black and white dots are grouped together to produce a halftone reproduction simulating shades of gray. If a halftone image is scanned, control proceeds to step 208 and converts the image data to gray scale data. The gray scale image data replaces with the halftone image data in the RED IMAGE FILE. If the scanned image data is not representative of a halftone image at step 206, control proceeds directly from step 206 to step 210.

At step 210, a green image is scanned from the target 16. The associated green image data is stored in the GREEN IMAGE FILE. In order to accomplish the scanning of a green image, the green filter portion 96G is selected by manually adjusting the filter selection switch 98d so that the portion 96G is in position beneath the filter window 70. Light reflecting off the target 16 from the light source 72 is filtered by the portion 96G so that the light passing through the window 70 to the scanner 12 is in the green frequency range. Then scanner 12 and the carriage 46 are reoriented to their position at the top end of the converter 14 adjacent to the first end wall 40d. The scanner 12 is slowly dragged across the glass 66 toward the bottom end of the converter 14 adjacent to the second end wall 40e.

Once the green image data is stored in the GREEN IMAGE FILE, control proceeds to step 212 to determine whether the scanner 12 has scanned a halftone image. If a halftone image is scanned, control proceeds to step 214 to convert the scanned image data to gray scale image data. The gray scale image data replaces the halftone data in the GREEN IMAGE FILE. If the scanned image data is not representative of a halftone image at step 212, control proceeds directly from step 212 to step 216.

At step 216, a blue image is scanned from the target 16. The associated blue image data is stored in the BLUE IMAGE FILE. In order to accomplish the scanning of the blue image, the blue filter portion 96B is selected. Light reflecting off the target 16 from the light source 72 is filtered by the portion 96B so that the light passing through the window 70 to the scanner 12 is in the blue frequency range. The scanner 12 and the carriage 46 are reoriented to their position at the top of the converter 14 adjacent to the first end wall 40d. The scanner is dragged slowly across the glass 66 toward the bottom end of the converter 14 adjacent to the second end wall 40e. Once the scan of the blue image data is completed, control proceeds to step 218 and the computer 18 determines whether the scanner 12 has scanned a halftone image. If a halftone image is scanned, control proceeds to step 22 to convert the halftone image data to gray scale image data. The gray scale image data replaces the halftone image data in the BLUE IMAGE FILE. If no such conversion is necessary or after the conversion at step 220 is completed, control proceeds to step 222.

At step 222, the computer 18 combines the data in the RED IMAGE FILE, GREEN IMAGE FILE and the BLUE IMAGE FILE and stores the combined data into the RGB IMAGE FILE. The data contained in the RGB IMAGE FILE is representative of a single, multiple color image. The data is stored in the RGB IMAGE FILE using a tag image file (TIF) format. It is understood, however, that other image file formats may be used.

Once the red, green, and blue image data has been combined and stored in the RGB IMAGE FILE, it can be utilized by the computer 18 in a variety of ways. At step 224, the RGB image data is displayed on the color display 20 to represent a multiple color image of the target 16. At step 226, the RGB image data is printed on the color printer 22 to represent a multiple color image of the target 16. The RGB image data may also be converted to another format as shown at step 228. At step 230, the RGB image data is processed. Processing may be desirable to improve the quality of the image by performing, for example, RGB intensity correction, gamma correction, or changes to the contrast or brightness of the image.

The system 10 of the present invention thus provides an efficient way to scan an target to provide a single, multiple color scanned image using a relatively inexpensive monochromatic scanner, without requiring disassembly or modification of the scanner.

While the invention is described in some detail with specific reference to a single embodiment and certain alternatives, there is no intent to limit the invention to that particular embodiment or those specific alternatives. For example, once skilled in the art could implement the system 10 using different monochromatic scanners and computer processors. Different display and printing devices are also contemplated. The image data may be stored in PCX, tag image file (TIF) or other formats. The target to be scanned need not necessarily be a document, but could also be an image projected onto a screen or other surface. The dimensions and configuration of the converter may be varied to accommodate different scanners and different types of images to be scanned. The true scope of the invention is defined not by the foregoing description, but by the following claims.

What is claimed is:

1. Apparatus for optically scanning a target utilizing a monochromatic scanner connected to a computer comprising:
   a light source for illuminating said target comprising at least one fluorescent tube;
   means for supporting said light source relative to said target comprising:
      a base defining an opening, said target appearing in said opening;
      a carriage containing said light source said carriage supported for movement between the ends of said base over said opening;
      means for supporting said scanner for movement relative to said base; and
      means for securing said scanner to said carriage such that said scanner and said carriage move together relative to said base; and
   means for filtering light from said light source to direct red, green or blue frequency light to said scanner, said filter means comprising red, green and blue filter elements and positioned between said light source and said scanner.

2. The apparatus of claim 1 wherein:
   said carriage defines a window over which said scanner is located for viewing said target; and
   said filter means is located within said carriage between said window and said light source.

3. Apparatus for optically scanning a target utilizing a monochromatic scanner connected to a computer, comprising:
   a base having first and second ends and defining an opening, said target appearing in said opening;
   a transparent support plate connected to said base for supporting said scanner for relative movement between said ends of said base over said opening;
   a carriage supported for relative movement between said ends of said base over said opening, said carriage defining a second opening over which said scanner is located for viewing said target;
   a light source supported by said carriage for illuminating said target;
   filter means supported by said carriage for filtering the light from said light source to direct either red, green or blue frequency light to said scanner; and
   means for securing said scanner to said carriage such that said scanner and said carriage move together relative to said base.

4. The apparatus of claim 3 wherein said carriage is supported relative to said base by guide rails.

5. The apparatus of claim 3 wherein said light source comprises at least one fluorescent tube.

6. The apparatus of claim 5 wherein said light source further comprises transformer means having a periodic oscillation of two kilohertz or greater.

7. The apparatus of claim 3 wherein said filter means comprises red, green and blue filter elements located between said light source and said second opening.

8. The apparatus of claim 7 wherein said filter elements are movable to select which one of said elements is to appear in said second opening, such that only one of said elements appears fully in said second opening at a time.

9. The apparatus of claim 3 wherein said securing means comprises opposing clips connected to said carriage, said scanner being biased between said clips.

* * * * *